US012289291B2

(12) United States Patent
Mohan Raj et al.

(10) Patent No.: US 12,289,291 B2
(45) Date of Patent: Apr. 29, 2025

(54) METHODS, SYSTEMS, AND COMPUTER READABLE MEDIA FOR MANAGING NETWORK FUNCTION REQUEST MESSAGES AT A SECURITY EDGE PROTECTION PROXY

(71) Applicant: Oracle International Corporation, Redwood Shores, CA (US)

(72) Inventors: John Nirmal Mohan Raj, Bangalore (IN); Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 161 days.

(21) Appl. No.: 17/856,936

(22) Filed: Jul. 1, 2022

(65) Prior Publication Data
US 2024/0007858 A1 Jan. 4, 2024

(51) Int. Cl.
*H04L 9/40* (2022.01)
*H04W 12/06* (2021.01)
*H04W 12/088* (2021.01)
*H04W 12/37* (2021.01)

(52) U.S. Cl.
CPC ....... *H04L 63/0236* (2013.01); *H04W 12/068* (2021.01); *H04W 12/088* (2021.01); *H04W 12/37* (2021.01)

(58) Field of Classification Search
CPC ............ H04L 63/0236; H04W 12/088; H04W 12/068; H04W 12/37
See application file for complete search history.

(56) References Cited

U.S. PATENT DOCUMENTS

| 2021/0360393 | A1* | 11/2021 | Nair ..................... H04W 12/106 |
| 2022/0014600 | A1* | 1/2022 | Ding ..................... H04L 67/563 |
| 2022/0124501 | A1* | 4/2022 | S Bykampadi ..... H04W 12/088 |
| 2022/0200966 | A1* | 6/2022 | de-Gregorio-Rodriguez ............. H04L 63/0281 |
| 2022/0377103 | A1* | 11/2022 | Shaw ...................... H04L 63/20 |

(Continued)

OTHER PUBLICATIONS

Arzo, Sisay Tadesse; Bassoli, Riccardo; Granelli, Fabrizio; Fitzek, Frank H. P.; "Study of Virtual Network Function Placement in 5G Cloud Radio Access Network," IEEE Transactions on Network and Service Management, Dec. 2020, vol. 17, No. 4, pp. 2242-2259.*

(Continued)

*Primary Examiner* — Victor Lesniewski
(74) *Attorney, Agent, or Firm* — Jenkins, Taylor & Hunt, P.A.

(57) ABSTRACT

Methods, systems, and computer readable media for managing network function (NF) request messages at a security edge protection proxy (SEPP) are disclosed. One method comprises receiving, by a SEPP and from an NF service consumer, an initial NF request message and obtaining a target NF type identifier, a requestor NF type identifier, and a network identifier from the initial NF request message. The method further includes utilizing the target NF type identifier, the requestor NF type identifier, and the network identifier to determine whether the initial NF request message is to be blocked by an associated service based interface at the SEPP and discarding, by the SEPP, the initial NF request message if the initial NF request message is determined to be blocked by the associated service based interface.

16 Claims, 6 Drawing Sheets

(56) References Cited

U.S. PATENT DOCUMENTS

| | | | |
|---|---|---|---|
| 2023/0247429 A1* | 8/2023 | Grayson | H04L 63/0281 |
| | | | 455/432.1 |
| 2023/0284008 A1* | 9/2023 | Muhanna | H04W 76/16 |
| | | | 455/432.1 |
| 2023/0292100 A1* | 9/2023 | Colom Ikuno | H04W 12/06 |
| 2023/0292131 A1* | 9/2023 | Khare | H04L 63/1458 |
| 2023/0319569 A1* | 10/2023 | Das | H04L 63/205 |
| | | | 455/410 |
| 2023/0413029 A1* | 12/2023 | Gajic | H04W 12/121 |
| 2024/0121587 A1* | 4/2024 | Ben Henda | H04L 63/166 |
| 2024/0267734 A1* | 8/2024 | Roemer | H04W 12/088 |
| 2024/0364600 A1* | 10/2024 | Bartolome Rodrigo | |
| | | | H04W 8/02 |

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).

"5G Interconnect Security," GSMA, Version 2.0, FS.36, pp. 1-61 (Jun. 3, 2021).

* cited by examiner

*Prior Art*

| Requestor NF type | Target NF type | Allowed SEPP Interface | Network Identifier | Service Type(s) |
|---|---|---|---|---|
| AMF | UDM | N8 | ANY | ALL |
| SMF | UDM | N10 | SEPP.OPER_B.COM | ALL |
| AMF | AUSF | N12 | ANY | ALL |
| vSMF | hSMF | N16 (home routed only) | SEPP.OPER_A.COM | ALL |
| SMSF | UDM | N21 | ANY | Service type 2, 3 |
| vPCF | hPCF | N24 (home routed only) | SEPP.OPER_A.COM | ALL |
| vNRF | hNRF | N27 | ANY | Service type 1 |
| vNSSF | hNSSF | N31 | ANY | ALL |

METHODS, SYSTEMS, AND COMPUTER READABLE MEDIA FOR MANAGING NETWORK FUNCTION REQUEST MESSAGES AT A SECURITY EDGE PROTECTION PROXY

TECHNICAL FIELD

The subject matter described herein relates to the management of network function (NF) request messages in fifth generation (5G) communications networks. More particularly, the subject matter described herein relates to methods, systems, and computer readable media for managing NF request messages at a security edge protection proxy (SEPP).

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a NF service producer. A network node that consumes services is referred to as a NF service consumer. A network function can be both a NF service producer and a NF service consumer depending on whether it is consuming or providing service.

A given NF service producer may have many service endpoints. NF service producers register with a network function repository function (NRF). The NRF maintains a NF profile of available NF instances and their supported services. Consumer NFs can subscribe to receive information about NF service producer instances that have registered with the NRF. Once registered, NF instances in the network may establish sessions with one or more network exposure functions (NEFs). Notably, the NEF is a Third Generation Partnership Project (3GPP) network function that provides a means to securely expose the services and capabilities provided by producer network functions servicing the network.

As part of stateless and/or stateful security countermeasures, an SEPP can be used to block certain 5G service based architecture (SBA) interfaces. For example, a SEPP can be configured to only permit NF discovery requests that are sent from an AMF to an AUSF/UDM. In contrast, the SEPP can be configured to block requests sent from an AMF to an SMF if the network operator chooses to utilize a non-home routing deployment for roaming mobile subscribers. In this example scenario, the NF discovery messages are not blocked at the SEPP. As such, the NF discovery response message (e.g., from the home network NRF) contains and/or lists the network services provided by the home PLMN, which in turn will be blocked at the visited PLMN (or any other network) due to security countermeasures being present (e.g., filter out certain session based interface (SBI) messages that are not expected to enter the network). Alternatively, the home network NRF can respond with an error message indicating that the requested network service is not permitted for the requested PLMN (i.e., home PLMN). This situation notably produces unnecessary signaling when the SEPP could have executed an immediate decision after receiving the NF discovery request message.

Accordingly, there exists a need for improved methods and systems for managing NF request messages at a SEPP.

SUMMARY

Methods, systems, and computer readable media for managing network function (NF) request messages at a security edge protection proxy (SEPP) are disclosed. One method comprises receiving, by a SEPP and from an NF service consumer, an initial NF request message and obtaining a target NF type identifier, a requestor NF type identifier, and a network identifier from the initial NF request message. The method further includes utilizing the target NF type identifier, the requestor NF type identifier, and the network identifier to determine whether the initial NF request message is to be blocked by an associated service based interface at the SEPP and discarding, by the SEPP, the initial NF request message if the initial NF request message is determined to be blocked by the associated service based interface.

According to another aspect of the method described herein, sending, by the SEPP, a failure indication message to the NF service consumer if the initial NF request message is determined to be blocked by the associated service based interface.

According to another aspect of the method described herein, forwarding the initial NF request message to an intended destination if the initial NF request message is determined to be allowed by the associated service based interface.

According to another aspect of the method described herein, wherein the SEPP is either a visited network SEPP or a home network SEPP.

According to another aspect of the method described herein, wherein the network identifier is a public land mobile network (PLMN) identifier.

According to another aspect of the method described herein, the PLMN identifier is obtained from a target PLMN list or from an interPLMN fully qualified domain name (FQDN).

According to another aspect of the method described herein, wherein whether the initial NF request message is to be blocked includes cross-referencing one or more of the target NF type identifier, the requestor NF type identifier, and the network identifier with entries in an interface configuration database to locate a matching entry.

According to another aspect of the method described herein, the interface configuration database identifies blocked SEPP interfaces and/or allowed SEPP interfaces for interPLMN packet traffic.

According to another aspect of the method described herein, the initial NF request message is a NF Discovery request message, an NF subscription request message, or an NF access token request message According to another aspect of the disclosed subject matter described herein, one system for managing NF request messages at a SEPP are disclosed. One method comprises a SEPP that is supported by at least one processor and a memory and an interface configuration manager that is implemented by the at least one processor configured for receiving, from an NF service consumer, an initial NF request message and obtaining a target NF type identifier, a requestor NF type identifier, and a network identifier from the initial NF request message. The interface configuration manager is further configured for utilizing the target NF type identifier, the requestor NF type identifier, and the network identifier to determine whether the initial NF request message is to be blocked by an associated service based interface at the SEPP, and discarding the initial NF request message if the initial NF request message is determined to be blocked by the associated service based interface.

According to another aspect of the system described herein, wherein the interface configuration manager is further configured for sending a failure indication message to the NF service consumer if the initial NF request message is determined to be blocked by the associated service based interface.

According to another aspect of the system described herein, wherein the interface configuration manager is further configured for forwarding the initial NF request message to an intended destination if the initial NF request message is determined to be allowed by the associated service based interface.

According to another aspect of the system described herein, wherein the SEPP is either a visited network SEPP or a home network SEPP.

According to another aspect of the system described herein, wherein the network identifier is a public land mobile network (PLMN) identifier.

According to another aspect of the system described herein, wherein the PLMN identifier is obtained from a target PLMN list or from an interPLMN fully qualified domain name (FQDN).

According to another aspect of the system described herein, wherein whether the initial NF request message is to be blocked includes cross-referencing one or more of the target NF type identifier, the requestor NF type identifier, and the network identifier with entries in an interface configuration database to locate a matching entry.

According to another aspect of the system described herein, wherein the interface configuration database identifies blocked SEPP interfaces and/or allowed SEPP interfaces for interPLMN packet traffic.

According to another aspect of the system described herein, wherein the initial NF request message is a NF Discovery request message, an NF subscription request message, or an NF access token request message.

The subject matter described herein may be implemented in hardware, software, firmware, or any combination thereof. As such, the terms "function" "node" or "manager" as used herein refer to hardware, which may also include software and/or firmware components, for implementing the feature being described. In one example implementation, the subject matter described herein may be implemented using one or more computer readable media having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for managing NF request messages at a security edge protection proxy (SEPP). In particular, the disclosed subject matter includes methods and systems that enables a SEPP to maintain an interface configuration database that contains entries designating service based architecture (SBA) interfaces at the SEPP to either block or allow certain NF request messages (e.g., NF Discovery request messages, NF Subscription request messages, and NF Access-Token request messages). Further, the disclosed subject matter can be conducted by a SEPP located in either a mobile subscriber's home network or visited network.

As indicated above, in order to execute certain stateless/stateful security countermeasures, a SEPP can be configured to prevent certain fifth generation (5G) SBA interfaces from communicating or forwarding NF request messages. For example, the SEPP can be configured to allow NF requests sent by an access and mobility management function (AMF) to an authentication service function (AUSF)/unified data management (UDM), but also block NF requests from an AMF to a session management function (SMF) in scenarios where a network operator opts to use a non-home routed deployment for roaming mobile subscribers. In such scenarios, NF discovery request messages to NRFs are not blocked. As a result, the home network NRF discovery response will likely list the network services provided by the home PLMN, which will be blocked at the visited network due to security countermeasures typically provided by the visited network SEPP. Alternatively, the home network NRF may respond with an error message stating that the intended NF service request is not allowed for the requesting PLMN (i.e., the visited PLMN). Both of these scenarios lead to unnecessary internetwork signaling when the SEPP could instead be configured to execute an initial decision at the onset of the NF discovery stage.

The disclosed subject matter is directed to reducing the amount of cross-network NF discovery requests (or other NF request message traffic) that ultimately fail. In some embodiments, the SEPP can be configured to leverage its implicit understanding that a NF discovery request message is based on the target NF type (i.e., per 3GPP 29.510) and the requestor NF type (i.e., per 3GPP 29.510). Further, the disclosed subject matter may also consider a network identifier, such as the PLMN ID, to assist with processing the NF discovery request message at a SEPP (e.g., a visited PLMN identifier can be used by a home network SEPP while a home PLMN identifier may be used by a visited network SEPP in a manner described below). In some embodiments, the PLMN identifier can be obtained from a discovery parameter, such as the target PLMN list, or from an inter-PLMN FQDN.

In some embodiments, the SEPP may be provisioned with an interface configuration manager that obtains (e.g., via parsing) a target NF type identifier, requestor NF type identifier, and an intended network identifier (e.g., PLMN-ID) from a received NF request message (e.g., a NF discovery request message). Using this identification information obtained from the NF request message, the interface configuration manager is configured to access a local interface configuration database to determine if a corresponding interface at the SEPP is configured to block or allow one or more NF request messages. If the designated interface at the SEPP (e.g., visited network SEPP) is blocked, the SEPP and/or interface configuration manager can fail and/or reject a NF discovery request message immediately (i.e., at the visited network SEPP) instead of communicating the request message over a NF32-f interface to the home network NRF (which would ultimately reject the NF discovery request message from the visited network NRF). If instead the interface at the SEPP is not blocked to a specific request message type, then the SEPP and/or interface configuration manager may then be permitted to forward the NF request message to the home network NRF (hNRF).

Reference will now be made in detail to various embodiments of the subject matter described herein, examples of which are illustrated in the accompanying drawings. Wherever possible, the same reference numbers will be used throughout the drawings to refer to the same or like parts.

Figure 1:
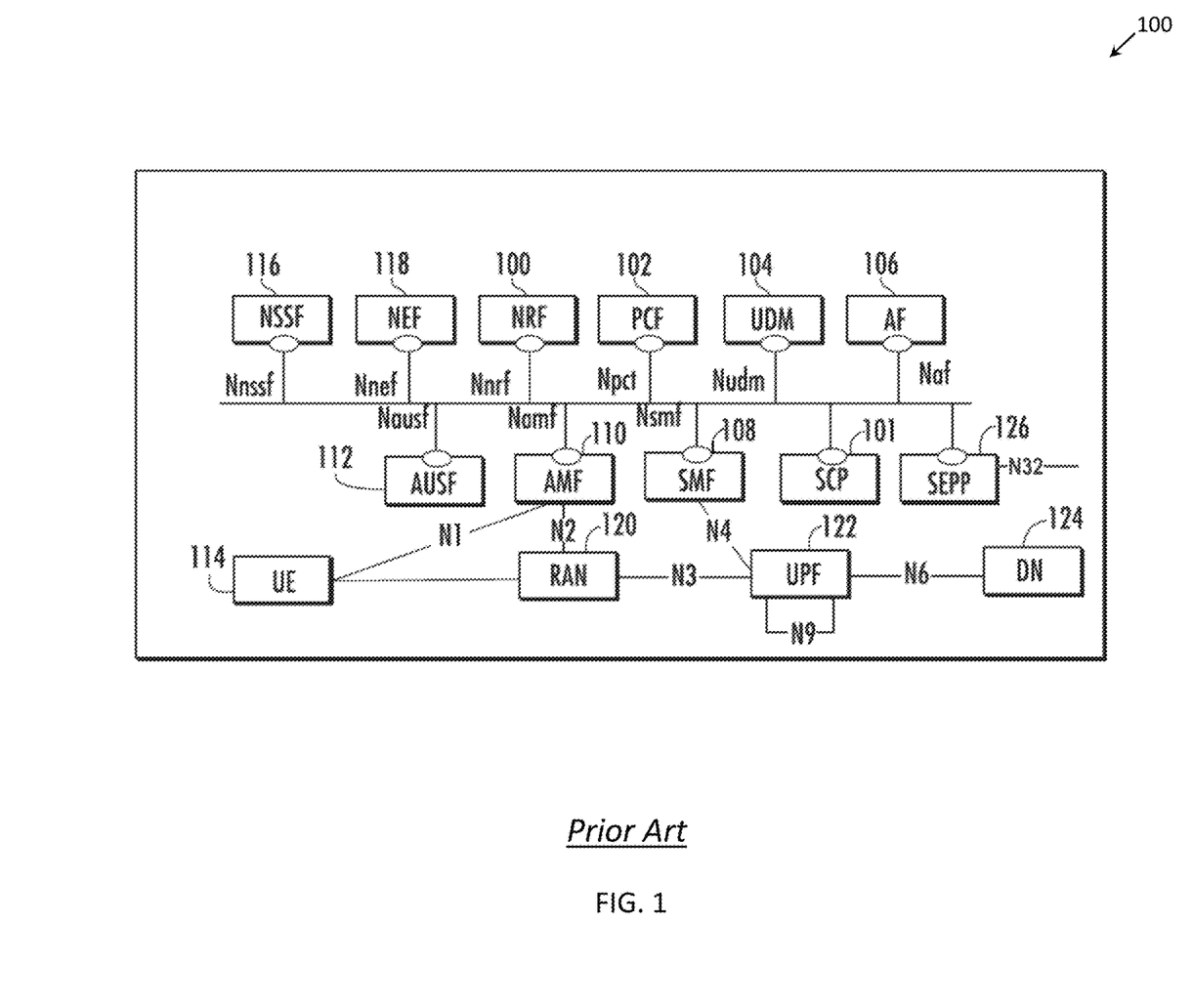
FIG. 1 is a network diagram illustrating an example fifth generation (5G) network architecture.

FIG. 1 is a block diagram illustrating an example 5G system network architecture, e.g., a home 5G core (5GC) network. The architecture in FIG. 1 includes an NRF 100 and a service communication proxy (SCP) 101, which may be located in the same home public land mobile network (PLMN). As described above, NRF 100 may maintain profiles of available NF service producer service instances and their supported services and allow consumer NFs or SCPs to subscribe to and be notified of the registration of new/updated NF service instances. SCP 101 may also support service discovery and selection of NF instances. SCP 101 may perform load balancing of connections between consumer and NF service producers. In addition, using the methodologies described herein, SCP 101 may perform preferred NF location based selection and routing.

NRF 100 is a repository for NF or service profiles of NF instances. In order to communicate with a NF instance, a consumer NF or an SCP must obtain the NF service profile or the NF instance from NRF 100. The NF or service profile is a JavaScript object notation (JSON) data structure defined in 3GPP Technical Specification (TS) 29.510. The NF or service profile definition includes at least one of a fully qualified domain name (FQDN), an Internet protocol (IP) version 4 (IPv4) address, or an IP version 6 (IPv6) address. In FIG. 1, any of the nodes (other than NRF 100) can be either consumer NFs or NF service producers, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. In some embodiments, the SEPP is an gateway device positioned on the edge of a network.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a NF service producer after applying application level security protection.

Figure 2:
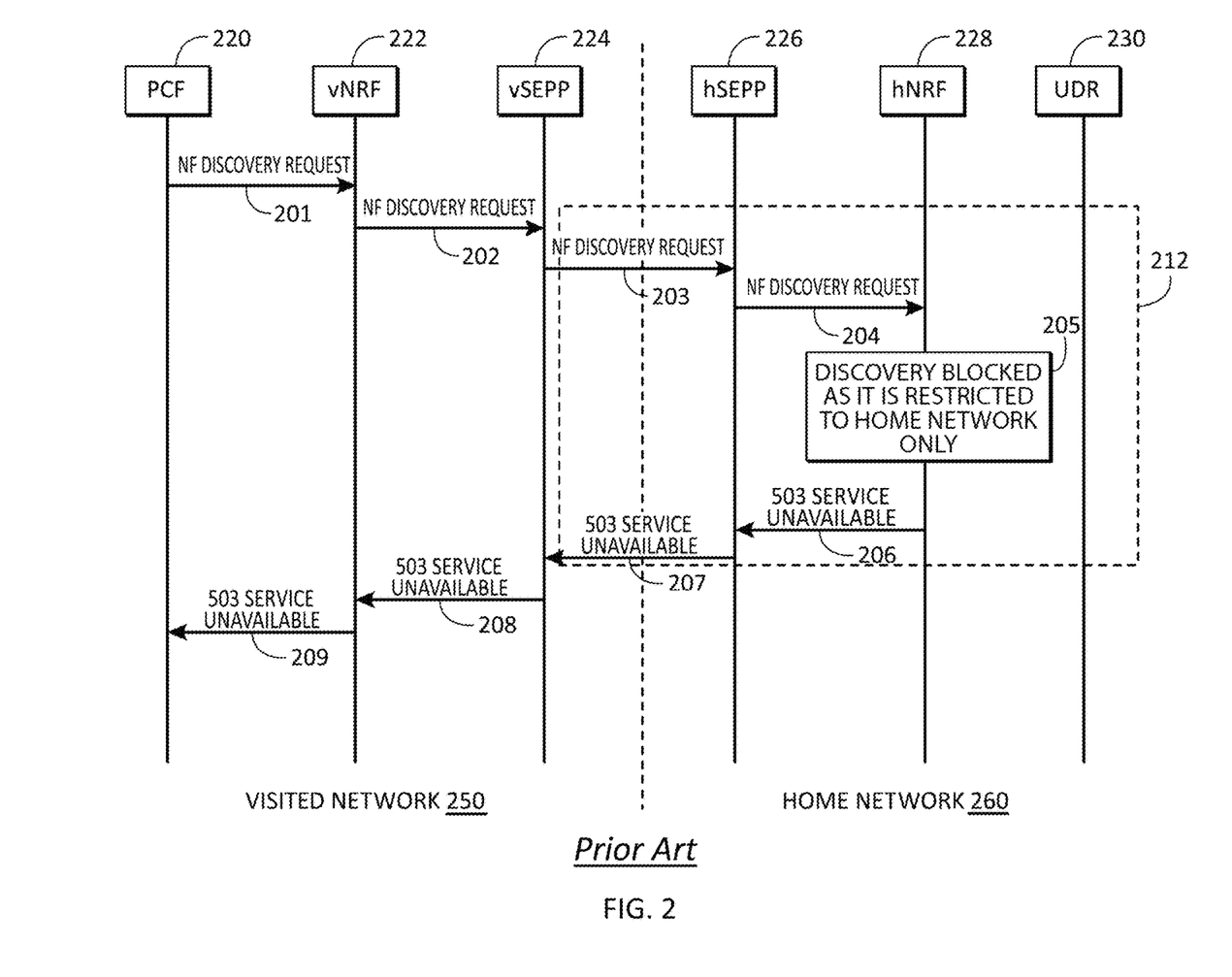
FIG. 2 is a signaling diagram illustrating an internetwork communication of an network function discovery request.

FIG. 2 depicts a signaling diagram illustrating an inter-network communication of an NF discovery request in a 5G communications network comprising a PCF 220, visited network NRF (vNRF) 222, visited network SEPP (vSEPP) 224, home network SEPP (hSEPP) 226, home network NRF (hNRF) 228, and UDR 230. In some embodiments, visited network SEPP 224 and home network SEPP 226 initially establish a transport layer security (TLS) connection (e.g., via N32-c and/or N32-f interfaces). After the TLS connection is established between the SEPPs, PCF 220 may send an NF discovery request message 201 on behalf of a mobile subscriber (not shown) roaming in visited network 250. The NF discovery request message 201 can be sent to vNRF 222 and may request discovery of the different UDR services provided by the roaming mobile subscriber's home network 260. Although FIG. 2 depicts an exemplary scenario where an NF Discovery request message is communicated, this signaling example may similarly demonstrate the communication of other NF request messages, such as a NF subscription request or NF access token request.

In response to receiving NF discovery request message 201, visited network NRF 222 parses and/or processes the routing network information (e.g., the PLMN identified by the MNC and MCC identifiers) of the NF discovery request message to determine that the destination NRF that resides in the mobile subscriber's home network 260. Accordingly, visited network NRF 222 directs the NF discovery request message (shown as request message 202) to visited network SEPP 224 for forwarding to the home network 260. Upon receiving NF discovery request message 202, visited network SEPP 224 identifies the MNC and MCC identifiers in the request message to identify the appropriate network and hNRF. Visited network SEPP 224 then forwards the NF discovery request message 203 to home network SEPP 226 in the home network 260 (e.g., the PLMN identified by the MNC and MCC identifiers). Home network SEPP 226 receives the NF discovery request message 203 and subsequently forwards the request message (shown as message 204) to a home network NRF 228.

After receiving NF discovery request message 204, home network NRF 228 makes a determination that NF discovery processing is not allowed for this particular message (e.g., see block 205 in FIG. 2). Notably, home network NRF 228 determines that the NF discovery request message is associated with a sending mobile subscriber that is roaming in visited network 250. For example, message traffic from PCF 220 (in visited network 250) sent to UDR 230 in the home network 260 should not be permitted (i.e., the home network PCF should have received the control of the mobile subscriber, not the visited network PCF; hence, the PCF to UDR interaction/communication should not be occurring from outside the home network). After determining that NF discovery request processing should not be permitted, home network NRF 228 may generate a '503-service unavailable' message to indicate that home network NRF 228 does not provide this network service for NF service consumers located outside of home network 260. Notably, the 503-service unavailable message 206 is sent by home network NRF 228 to home network SEPP 226, which in turn forwards the service unavailable message (i.e., the 503-service unavailable message 207) to visited network SEPP 224 in the visited network 250 via the previously established TLS connection. After receiving the 503-service unavailable message 207, visited network SEPP 224 directs the unavailability message to visited network NRF 222. Visited network NRF 222 then forwards 503-service unavailable message 209 to PCF 220, which then notifies the original mobile subscriber roaming in visited network 250.

Notably, FIG. 2 illustrates a signaling message flow scenario where a number of messages are communicated between network elements in both the visited network 250 and home network 260 of a roaming mobile subscriber. More specifically, it is not until the NF discovery request message reaches home network NRF 228 in home network 260 that the decision to reject the NF discovery request message is finally made. Further, the series/sequence of messages indicated in dashed box 212 can be avoided via the implementation of the disclosed subject matter (as shown in FIG. 3 and described below).

Figure 3:
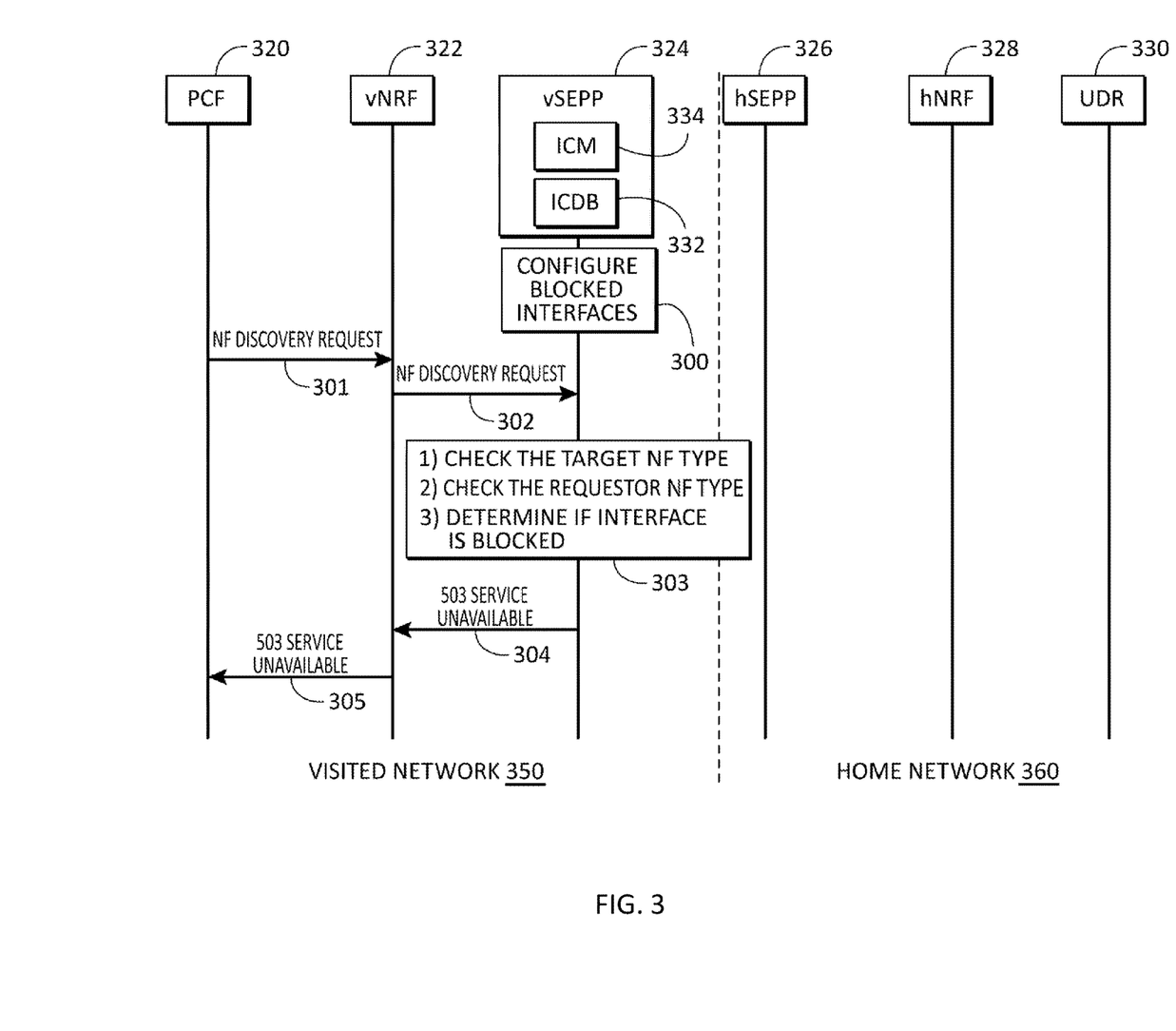
FIG. 3 is a signaling diagram illustrating an internetwork communication of an network function discovery request via a security edge protection proxy provisioned with an interface configuration manager and an interface configuration database.

FIG. 3 depicts a signaling diagram illustrating the inter-network communication of a NF discovery request message via an SEPP provisioned with an interface configuration manager operating in a 5G communications network, which comprises a PCF 320, visited network NRF (vNRF) 322, visited network SEPP (vSEPP) 324, home network SEPP (hSEPP) 326, home network NRF (hNRF) 328, and user data repository (UDR) 330. Although FIG. 3 depicts an exemplary scenario where an NF discovery request message is communicated and processed via an interface configuration manager 334 in SEPP 324, the example in FIG. 3 may similarly demonstrate the communication and processing of other NF request messages, such as a NF subscription request or NF access token request, by vSEPP 324 and/or its interface configuration manager 334.

In some embodiments, visited network SEPP 324 and home network SEPP 326 initially establish a TLS connection (e.g., via N32-c and/or N32-f interfaces). After the TLS connection is established, PCF 320 may direct an NF discovery request message 301 to visited network NRF 322. In response to receiving the NF discovery request message 301, visited network NRF 322 parses and/or processes the routing network information (e.g., the PLMN identified by the MNC and MCC identifiers) of the NF discovery request message to determine that the destination NRF resides in the mobile subscriber's home network 360. Accordingly, visited network NRF 322 directs the NF discovery request message (shown as request message 302) to visited network SEPP 324 for communication to home network 360

In some embodiments, visited network SEPP 324 is provisioned with an interface configuration manager 334 and an interface configuration database 332. Interface configuration manager 334 may include an algorithm or software script that is stored in memory and executed by a processor to manage and/or modify a number of SBA interface configurations existing at visited network SEPP 324.

Further, visited network SEPP 324 may be provisioned with an interface configuration database 332, which is adapted to include a plurality of operator-configurable database entries that is associated with a respective number of service based interfaces existing at vSEPP 324. One exemplary interface configuration database is described below and illustrated in FIG. 4. Although interface configuration manager 334 and interface configuration database 332 are shown in FIG. 3 as residing in vSEPP 324, these components can similarly and/or alternatively be hosted by a SEPP located in home network 360 (e.g., hSEPP 326) without deviating from the scope of the disclosed subject matter.

Figure 4:
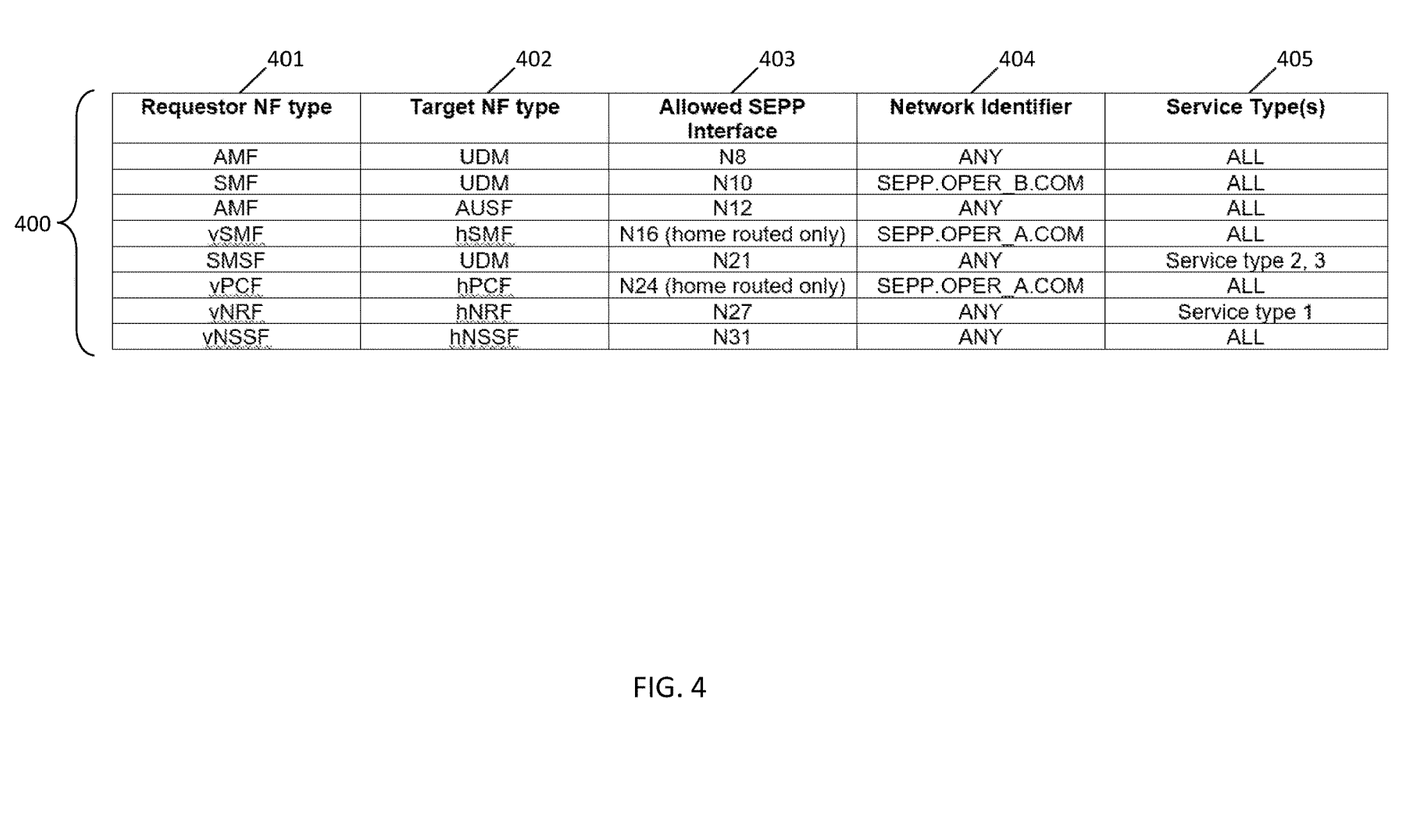
FIG. 4 is a diagram illustrating an exemplary interface configuration database.

As indicated above, one exemplary interface configuration database 332 supported at SEPP 324 as shown in FIG. 3 may be embodied as an interface configuration database table illustrated in FIG. 4. Notably, FIG. 4 depicts interface configuration database table 400, which includes a requestor NF type column 401, a target NF type column 402, an allowed SEPP interface column 403, an intended network identifier column 404, and a service type column 405. In some embodiments, requestor NF type column 401 contains identification data indicative of the type of NF service consumer that is configured to issue an allowable NF service request (e.g., NF discovery request). Likewise, target NF type column 402 contains identification data indicative of the type of NF service consumer that is the target or destination of the NF request made by the requesting entity type specified in requestor NF type column 401. For example, the first row of entries of interface configuration database table 400 indicates that at least one allowable NF service request is made by an AMF and is directed to a UDM over an N8 interface.

In some embodiments, entries of interface configuration database table 400 can also further indicate a specific network identifier (e.g., a target/intended PLMN) in addition to the target NF type and/or requestor NF type. For example, while the first entry of table 400 indicates that NF request messages sent from an AMF to a UDM via the N8 interface to 'ANY' network will be allowed, the second entry of interface configuration database table 400 indicates that a NF request message sent from an SMF to a UDM via an N10 interface will be allowed if the SMF is in a network corresponding to the address identifier 'SEPP.OPER_B.COM'.

Moreover, column 405 of interface configuration database table 400 indicates a specific NF service type and/or corresponding request message type of the message(s) that is allowed by the SEPP. For example, the first row of interface configuration database table 400 indicates that 'ALL' NF request messages (i.e., requesting 'any/all' service types) sent from an AMF to a UDM via the N8 interface (to 'ANY' network) will be allowed. In contrast, the seventh row of interface configuration database table 400 indicates that only request messages requesting 'Service type 1' (e.g., an NF Discovery request message) that is sent from a visited network NRF to a home network NRF via the N27 interface (from 'ANY' network) supported by the SEPP will be allowed.

In some embodiments, interface configuration database table 400 can be wholly configured by a network operator. For example, a network operator can add or delete any number of columns of interface configuration database table 400. Further, a network operator can add any configuration data or parameter(s) to the entries of interface configuration database table 400 without departing from the scope of the disclosed subject matter (i.e., the operator can configure a list of interfaces that is configured to allow or block communications traversing the SEPP to or from another network). Moreover, interface configuration database table 400 can be configured to indicate the types of messages or services that will be blocked or "blacklisted" (i.e., instead of allowed or "whitelisted") by the SEPP as discussed in the example above.

Returning to FIG. 3, visited network SEPP 324 and/or interface configuration manager 334 is configured to conduct a NF request message analysis generally depicted in block 303. For example, visited network SEPP 324 and/or interface configuration manager 334 may parse NF discovery request message 302 to extract the target NF type identifier, the requestor NF type identifier, and/or the network identifier. Once the identification information is obtained, the interface configuration manager 334 can determine if a SBA interface at the supporting SEPP (e.g., vSEPP 324) is configured to allow (and/or block) one or more particular NF request message types originating from the indicated requestor NF type and sent to the indicated target NF type (over the associated interface). In some embodiments, the interface configuration manager 334 may cross-reference the obtained identification information with entries contained in the interface configuration database 332 (e.g., as described above with regard to FIG. 4). If the interface configuration manager 334 determines that an entry matches the identification information (e.g., target NF type identifier, the requestor NF type identifier, and/or the network identifier), then interface configuration manager 334 will acknowledge the associated SEPP interface (i.e., interfaced used by the target NF type and requestor NF type) as being designated to allow the communication of the NF discovery request message from the SEPP (i.e., the interface is open for communication). If interface configuration manager 334 cannot locate an entry in interface configuration database 332 that includes entry information that matches the identification information, then interface configuration manager 334 will determine that the interface is blocked to the NF request message. The interface configuration manager 334 may then be configured to drop and/or reject the NF discovery request message at the SEPP. Notably, the NF discovery request message 302 is not forwarded by vSEPP 324 to home SEPP 326 in the home network 360 (e.g., the PLMN identified by the MNC and MCC identifiers).

After determining that the interface is blocked (i.e., not open or allowed) for the NF discovery request message, vSEPP 324 and/or interface configuration manager 334 may generate a '503-service unavailable' message 304 to indicate that the interface at the vSEPP 324 is blocked to the NF discover request message. Notably, the 503-service unavailable message 206 is sent by vSEPP 324 to vNRF 322, which in turn forwards the service unavailable message (503-service unavailable message 305) to PCF 320 in the visited network 350. PCF 320 subsequently notifies the original roaming mobile subscriber that discovery service is unavailable.

Figure 5:
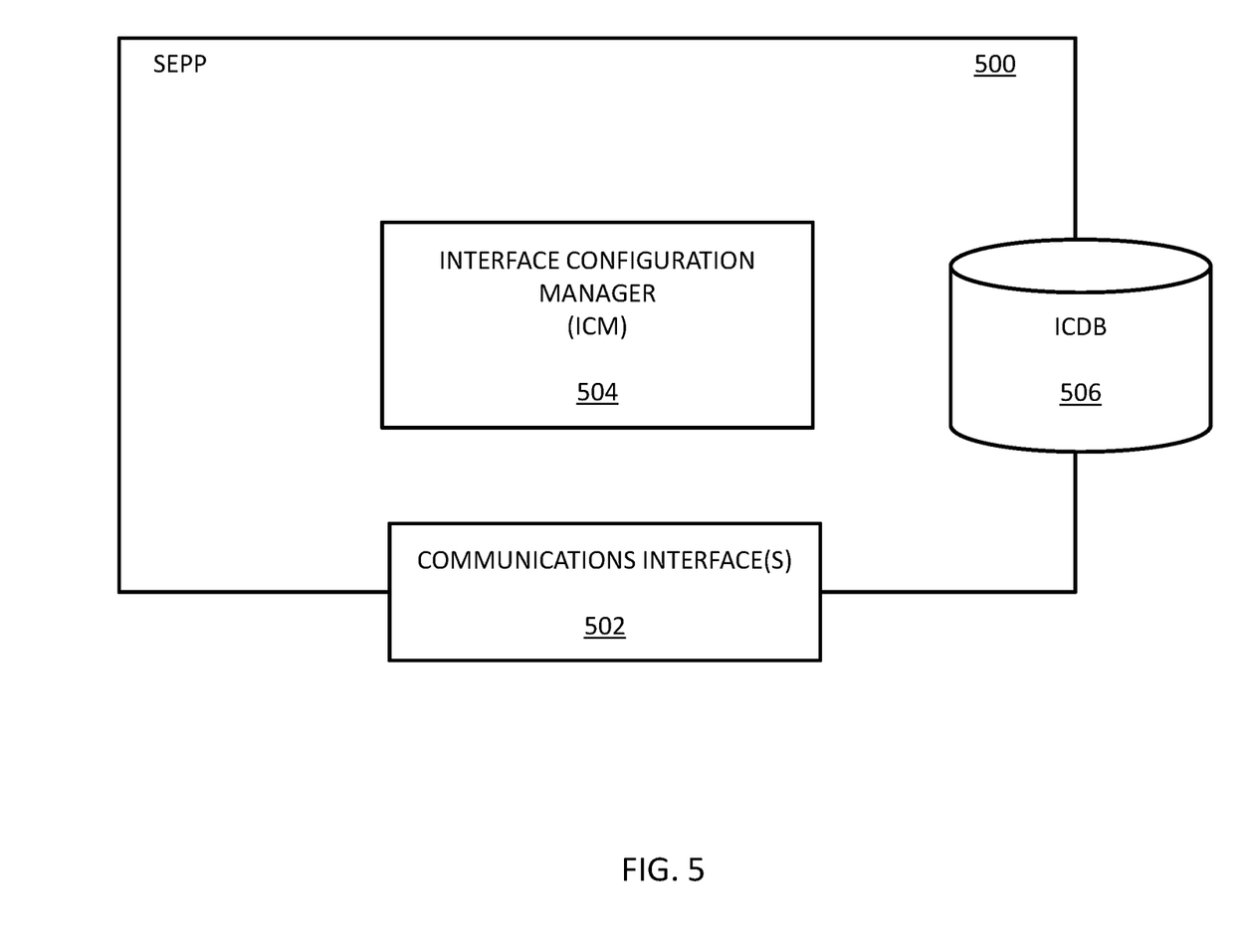
FIG. 5 is a block diagram illustrating an exemplary architecture for a security edge protection proxy configured for managing NF request messages.

FIG. 5 is a diagram illustrating an example network node, e.g., SEPP 500, for managing NF request messages in a communications network. SEPP 500 may represent any suitable entity or entities (e.g., one or more node(s), device(s), or computing platform(s)) for performing various aspects associated with managing NF request messages via the blocking of local SBA interfaces. In some embodiments, SEPP 500 may represent or include an authorization server, a network gateway, a network proxy, an edge security device, an exposure function, or other functionality.

Referring to FIG. 5, SEPP 500 may include one or more communications interface(s) 502 for communicating messages via a communications environment, e.g., one or more 5G networks. For example, communications interface(s) 502 may include one or more communication interfaces for communicating with various entities operating in a home network (e.g., home public land mobile network (H-PLMN)) or a visited network (e.g., a visited public land mobile network (V-PLMN)).

SEPP 500 may include an interface configuration manager (ICM) 504. ICM 504 may be any suitable entity (e.g., software stored in memory and executing on at least one processor) for performing one or more aspects associated with sharing key identification and public certificate data for access token verification in a communications network. In some embodiments, ICM 504 may be configured for receiving, by a SEPP and from an NF service consumer, an initial NF request message; obtaining a target NF type identifier, a requestor NF type identifier, and a network identifier from the initial NF request message; utilizing the target NF type identifier, the requestor NF type identifier, and the network identifier to determine whether the initial NF request message is to be blocked by an associated service based interface at the SEPP; and discarding, by the SEPP, the initial NF request message if the initial NF request message is determined to be blocked by the associated service based interface.

SEPP 500 may also include interface configuration database 506 which can include any storage medium that is configured to store and maintain database tables that contain entries including identification information such as target NF type identifiers, the requestor NF type identifiers, and/or the network identifiers, and the like (e.g., see discussion regarding interface configuration database table 400 above). SEPP 500 and/or ICM 504 can be configured to add or delete entire entries during the course of operation.

Figure 6:
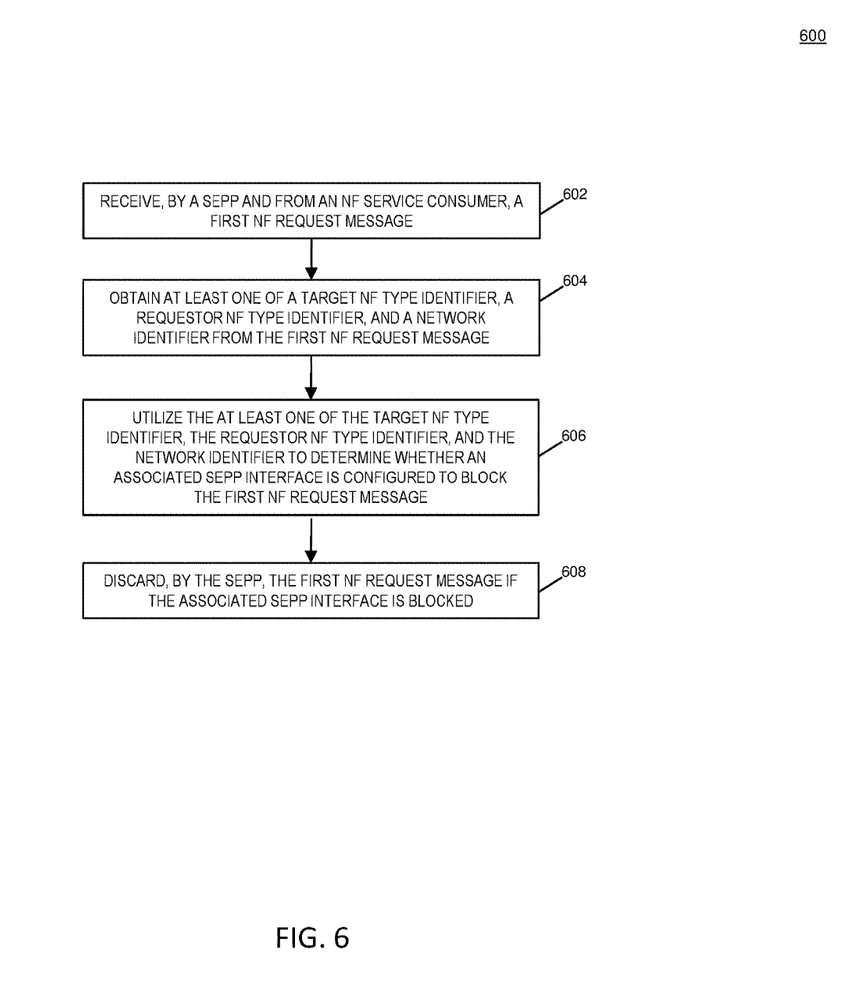
FIG. 6 is a flow diagram illustrating an exemplary method for managing NF request messages at a security edge protection proxy.

FIG. 6 is a flow chart illustrating an example process for managing NF request messages at a SEPP according to an embodiment of the subject matter described herein. In some embodiments, method 600 depicted in FIG. 6 is an algorithm, program, or script (e.g., SEPP interface configuration manager) stored in memory that when executed by a processor performs the steps recited in blocks 602-608. In some embodiments, method 600 represents a list of steps embodied in a state machine (e.g., either via software code programming or via a set of rules) and/or logic of the SEPP and/or host computing device.

In block 602, the method includes receiving, by a SEPP and from an NF service consumer, an initial NF request message. In some embodiments, a visited network SEPP in a visited network receives an NF discovery request message from a PCF via a visited network NRF. For example, a mobile subscriber device may be roaming in the visited network and communicates with a PCF. In response, the PCF may be configured to function as a NF service consumer and generate a NF discovery request message that is directed to the NRF in the mobile subscriber's home network (i.e., a home network NRF). However, the NF discovery request message is first sent to the NRF in the visited network, which in turn forwards the NF discovery request message to the visited network SEPP (that directs the message to a SEPP in the home network for delivery to the aforementioned home network NRF).

In block 604, the method includes obtaining a target NF type identifier, a requestor NF type identifier, and a network identifier from the initial NF request message. In some embodiments, the interface configuration manager is configured to conduct an NF request message analysis to determine whether the initial NF request message is to be blocked by the SEPP interface. For example, the interface configuration manager may be configured to inspect a NF discovery request message to identify the target NF type and the requestor NF type (which indirectly designates the service-based interface being used at the SEPP). The interface configuration manager may also compare the network identifier in the request message to the entries of the interface configuration database to determine whether the request message is to be blocked by the service-based interface.

In block 606, the target NF type identifier, the requestor NF type identifier, and/or the network identifier are utilized to determine whether an associated service-based interface at the SEPP is configured to block the initial NF request message. For example, the interface configuration manager may identify that the NF discovery request message includes a requestor NF type of "PCF" and target NF type of "UDR". Accordingly, the interface configuration manager is then adapted to use this identifier information to cross-reference entries in a local interface configuration database (e.g., database table 400 shown in FIG. 4). If an entry in the database is found, the interface configuration manager will allow (e.g., not block) the associated NF discovery request message at the service-based interface. Otherwise, method 600 continues to block 608.

In block 608, the initial NF request message is discarded if the initial NF request message is determined to be blocked by the associated service-based interface at the SEPP (e.g., the interface at the SEPP is blocked to the initial NF request message). In some embodiments, the interface configuration manager is further configured to send a rejection notification message (e.g., 503 service unavailable message) to the original requesting entity if the interface is blocked.

It should be noted that the modified SEPP, interface configuration manager, and/or functionality described herein may constitute or be facilitated by a special purpose computing device. Further, the modified SEPP and/or functionality described herein can improve the technological field pertaining to network communications. For example, the determination or check conducted by the interface configuration manager at an SEPP can eliminate and/or avoid unnecessary processing times associated with a requesting NF service consumer waiting for a response from a home network NRF. Moreover, the disclosed subject matter reduces interPLMN signaling traffic by compelling the SEPP to assess the blocked interface determination at an earlier stage in the discovery process. Likewise, convergence times (e.g., the time required to arrive at the interface blocking decision) are similarly reduced.

The disclosure of each of the following references is incorporated herein by reference in its entirety.

REFERENCES 1. 3$^{rd}$ Generation Partnership Project; Technical Specification 5G; 5G System; Network function repository services; Stage 3 (Release 16) 3GPP TS 29.510 V16.5.0 (2020-November)
2. 3$^{rd}$ Generation Partnership Project; Technical Specification Group Services and System Aspects; Technical Realization of Service Based Architecture; Stage 3 (Release 16) 3GPP TS 29.500 V16.5.0 (2020-November)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for managing network function (NF) request messages at a security edge protection proxy (SEPP), the method comprising:
   receiving, by a SEPP and from a visited NF repository function (NRF), an NF discovery request message, wherein the SEPP is configured to allow NF discovery request messages from the visited NRF to a home NRF over an N27 interface;
   obtaining, from the NF discovery request message, a target NF type identifier, a requestor NF type identifier, and a network identifier;
   utilizing the target NF type identifier, the requestor NF type identifier, and the network identifier to determine whether a network service, provided by a home public land mobile network (PLMN) and discovery of which is requested by the NF discovery request message, is blocked at a visited PLMN; and
   discarding, by the SEPP, the NF discovery request message when the network service is blocked at the visited PLMN.

2. The method of claim 1 comprising sending, by the SEPP, a failure indication message to the network service is blocked at the visited PLMN.

3. The method of claim 1 comprising forwarding the NF discovery request message to an intended destination when the network service is allowed at the visited PLMN.

4. The method of claim 1 wherein the network identifier is a PLMN identifier.

5. The method of claim 4 wherein the PLMN identifier is obtained from a target PLMN list or from an inter-PLMN fully qualified domain name (FQDN).

6. The method of claim 1 wherein utilizing the target NF type identifier, the requestor NF type identifier, and the network identifier to determine whether the network service, provided by the home PLMN and discovery of which is requested by the NF discovery request message, is blocked at the visited PLMN includes cross-referencing one or more of the target NF type identifier, the requestor NF type identifier, and the network identifier with entries in an interface configuration database to locate a matching entry.

7. The method of claim 6 wherein the interface configuration database identifies blocked interfaces and/or allowed interfaces for inter-PLMN packet traffic.

8. A system for managing network function (NF) request messages at a security edge protection proxy (SEPP), the system comprising:
a security edge protection proxy (SEPP) that is supported by at least one processor and a memory; and
an interface configuration manager that is implemented by the at least one processor configured for receiving, from a visited NF repository function (NRF), an NF discovery request message, wherein the SEPP is configured to allow NF discovery request messages from the visited NRF to a home NRF over an N27 interface and the interface configuration manager is configured for obtaining, from the NF discovery request message, a target NF type identifier, a requestor NF type identifier, and a network identifier, utilizing the target NF type identifier, the requestor NF type identifier, and the network identifier to determine whether a network service, provided by a home public land mobile network (PLMN) and discovery of which is requested by the NF discovery request message, is blocked at a visited PLMN and discarding the initial NF discovery request message when the network service is blocked at the visited PLMN.

9. The system of claim 8 wherein the interface configuration manager is further configured for sending, by the SEPP, a failure indication message to the visited NRF when the network service is blocked at the visited PLMN.

10. The system of claim 8 wherein the interface configuration manager is further configured for forwarding the NF discovery request message to an intended destination when the network service is allowed at the visited PLMN.

11. The system of claim 8 wherein the network identifier is a PLMN identifier.

12. The system of claim 11 wherein the PLMN identifier is obtained from a target PLMN list or from an inter-PLMN fully qualified domain name (FQDN).

13. The system of claim 8 wherein utilizing the target NF type identifier, the requestor NF type identifier, and the network identifier to determine whether the network service, provided by the home PLMN and discovery of which is requested by the NF discovery request message, is blocked at the visited PLMN includes cross-referencing one or more of the target NF type identifier, the requestor NF type identifier, and the network identifier with entries in an interface configuration database to locate a matching entry.

14. The system of claim 13 wherein the interface configuration database identifies blocked interfaces and/or allowed interfaces for inter-PLMN packet traffic.

15. One or more non-transitory computer readable media having stored thereon executable instructions that when executed by at least one processor of a computer cause the computer to perform steps comprising:
receiving, by a SEPP and from a visited network function (NF) repository function (NRF), an NF discovery request message, wherein the SEPP is configured to allow NF discovery request messages from the visited NRF to a home NRF over an N27 interface;
obtaining, from the NF discovery request message, a target NF type identifier, a requestor NF type identifier, and a network identifier;
utilizing the target NF type identifier, the requestor NF type identifier, and the network identifier to determine whether a network service, provided by a home public land mobile network (PLMN) and discovery of which is requested by the NF discovery request message, is blocked at a visited PLMN; and
discarding the NF discovery request message when the network service is blocked at the visited PLMN.

16. The one or more non-transitory computer readable media of claim 15 comprising sending, by the SEPP, a failure indication message to the visited NRF when the network service is blocked at the visited PLMN.

* * * * *

UNITED STATES PATENT AND TRADEMARK OFFICE
CERTIFICATE OF CORRECTION

PATENT NO. : 12,289,291 B2
APPLICATION NO. : 17/856936
DATED : April 29, 2025
INVENTOR(S) : Mohan Raj et al.

Page 1 of 1

It is certified that error appears in the above-identified patent and that said Letters Patent is hereby corrected as shown below:

In the Specification

In Column 1, Line 40, before "network" insert -- 5G --.

In Column 2, Line 39, delete "interPLMN" and insert -- inter-PLMN --, therefor.

In Column 2, Line 50, delete "interPLMN" and insert -- inter-PLMN --, therefor.

In Column 2, Line 54, delete "message" and insert -- message. --, therefor.

In Column 3, Line 26, delete "interPLMN" and insert -- inter-PLMN --, therefor.

In Column 3, Line 37, delete "interPLMN" and insert -- inter-PLMN --, therefor.

In Column 8, Line 18, delete "360" and insert -- 360. --, therefor.

In Column 12, Line 3, delete "interPLMN" and insert -- inter-PLMN --, therefor.

In the Claims

In Column 13, Line 23, in Claim 8, before "NF" delete "initial".

Signed and Sealed this
Twenty-second Day of July, 2025

Coke Morgan Stewart
*Acting Director of the United States Patent and Trademark Office*